US005085546A

United States Patent [19]

Fischer

[11] Patent Number: 5,085,546

[45] Date of Patent: Feb. 4, 1992

[54] MOUNTING ASSEMBLY WITH AN EXPANSIBLE ANCHOR AND A MOUNTING TOOL

[75] Inventor: Artur Fischer, Waldachtal, Fed. Rep. of Germany

[73] Assignee: Fischerwerke Artur Fischer GmbH & Co. KG, Waldachtal, Fed. Rep. of Germany

[21] Appl. No.: 595,302

[22] Filed: Oct. 10, 1990

[30] Foreign Application Priority Data

Oct. 10, 1989 [DE] Fed. Rep. of Germany ....... 3933813

[51] Int. Cl.[5] .............................................. F16B 13/06

[52] U.S. Cl. ........................................ 411/55; 411/60; 411/3; 81/44

[58] Field of Search ........................ 411/2, 3, 5, 54, 55, 411/57, 60, 61, 271, 325; 81/44

[56] References Cited

U.S. PATENT DOCUMENTS 4,904,134 2/1990 Fischer ................................ 411/54

4,943,195 7/1990 Fischer ................................ 411/60

*Primary Examiner*—Neill R. Wilson

*Attorney, Agent, or Firm*—Michael J. Striker

[57] ABSTRACT

A mounting assembly includes an expansible anchor having a threaded bolt, an expansible sleeve, and a shank member having an internal thread that enables the shank member to be screwed onto the threaded bolt to provide for expansion of the expansible sleeve over the expander body of the threaded bolt. The mounting assembly also includes a mounting tool adapted to be clamped in a drill chuck of an impact drilling machine and the like and having an end portion shaped like a polyhedron for engaging the internal bore of the shank member which internal bore has a diameter that is less than the diameter of the internal thread.

The internal bore and the polyhedron end portion has lateral faces and edges such that, when the mounting tool clamped is engaged with the internal bore and the drill operated, the shank member rotates with the mounting tool until the installation is complete.

3 Claims, 2 Drawing Sheets

MOUNTING ASSEMBLY WITH AN EXPANSIBLE ANCHOR AND A MOUNTING TOOL

BACKGROUND OF THE INVENTION

The invention relates to a mounting assembly which comprises an expansible anchor including a threaded bolt having an expander body, and a shank member having an internal thread with which the shank member is screwed onto the threaded bolt to anchor the expansible anchor in a drilled hole in masonry, and a mounting tool adapted to be clamped in a drill bit chuck of an impact drilling machine or the like and which engages a free end surface of the shank member to screw the shank member onto the threaded bolt.

Driving-in tools, which can be clamped in the chuck of hammer drills and impact drilling machines for anchoring expansible anchors in drilled holes in masonry, are known. The known driving-in tools generally consist of a hardened steel sleeve which transmits the impact action of the impact drilling machine or hammer drills to the expansible anchor. A drawback of the known driving-in tools consists in that, when the drilling machine is lowered, the driving-in tool frequently drops out of the drilling machine and has to be repositioned. An expansible anchor to be mounted with such a driving tool is disclosed in German Published Patent Application 3,634,431.

Also known are expansible anchors having a rotatable shank member which, upon being rotated, pushes an expansible sleeve onto an expander cone of a threaded bolt. The shank member can be rotated either manually or with a screwdriver or a similar tool.

SUMMARY OF THE INVENTION

The object of the invention is to provide means for mechanically rotating the shank member for pushing an expansible sleeve onto an expander cone of a threaded bolt. The object of the invention is achieved by providing a mounting tool having at an end portion thereof shaped like a polyhedron that engages, during mounting of the expansible anchor, the internal bore of the shank member, which internal bore has a diameter that is less than the diameter of the inner thread of the shank member.

Upon actuation of the impact drilling machine, the edges of the polyhedron end portion of the mounting tool engages and punches into the wall of the internal bore of the shank member and move the shank member downward whereby the expansible sleeve is pushed over the expander body of the threaded bolt until a matching fit of the sleeve with the masonry hole is obtained. When further expansion of the expansible sleeve is not possible, the edges of the polyhedron end portion of the mounting tool act as cutters reaming out the internal bore of the shank member to a diameter corresponding to the distance between opposite flats of the polyhedron. Therefore, the torque is not any more transferred to the shank member. This protects the expansible anchor from destruction.

The impact occurring when the torque is not applied any more to the shank member is substantially eliminated in a preferred embodiment when the polyhedron has opposing parallel lateral faces (i.e. hexagonal) and by selecting the distance between the opposite lateral faces of the polyhedron end portion substantially equal to the diameter of the internal bore of the shank member, and the length of the polyhedron end portion equal to about one third of that distance.

To limit the penetration of the polyhedron end portion into the internal bore and to improve the impact effect on the shank member, the mounting tool has a stop shoulder which rests on the end face of the shank member as it is being driven in.

The present invention both as to its construction so to its mode of operation, together with additional objects and advantages thereof, will be best understood from the following detailed description of specific embodiments when read in connection with the accompanying drawings.

DETAILED DESCRIPTION OF THE PREFERRED EMBODIMENTS

Figure 1:
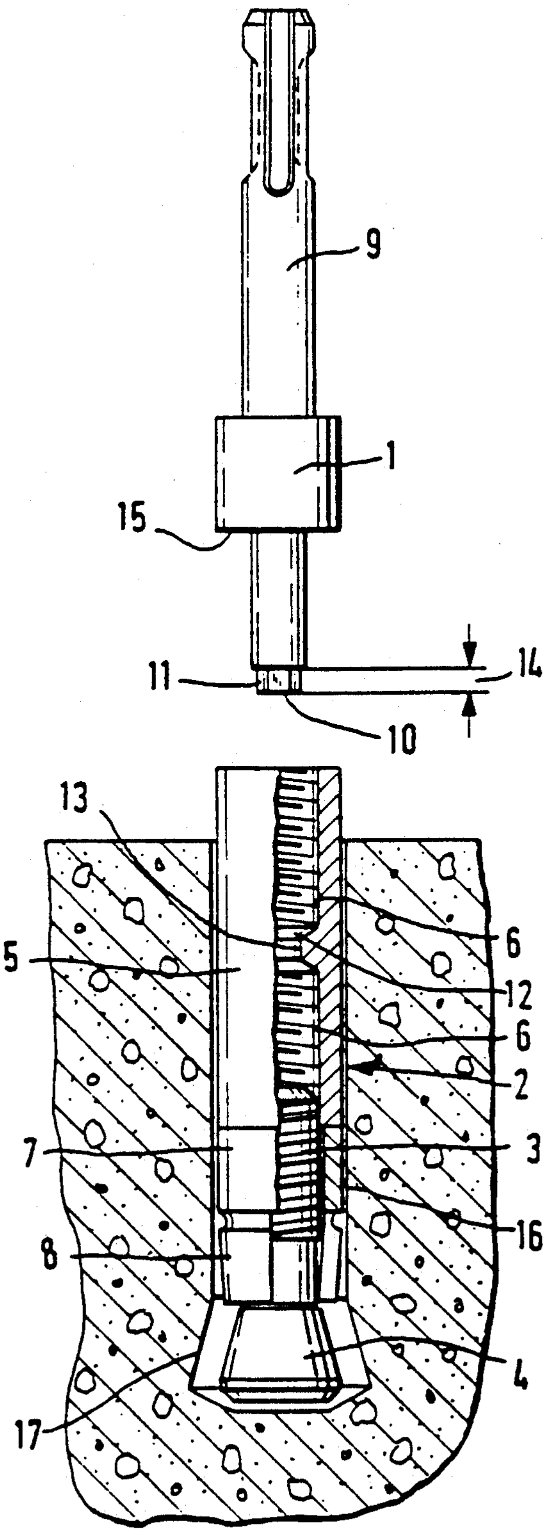
FIG. 1 is an elevational partially cross-sectional view of a mounting assembly according to the invention.

A mounting assembly shown in FIG. 1, comprises a mounting tool 1 and an expansible anchor 2 including a threaded bolt 3 with an expander cone 4. The threaded bolt 3 extends into a shank member 5 having an internal thread 6 that enables the shank member 5 to be screwed onto the thread bolt 3. An axially displaceable expansible sleeve 7 with expansible leaves 8 is arranged between the shank member 5 and the expander body 4 of the bolt 3.

Figure 2:
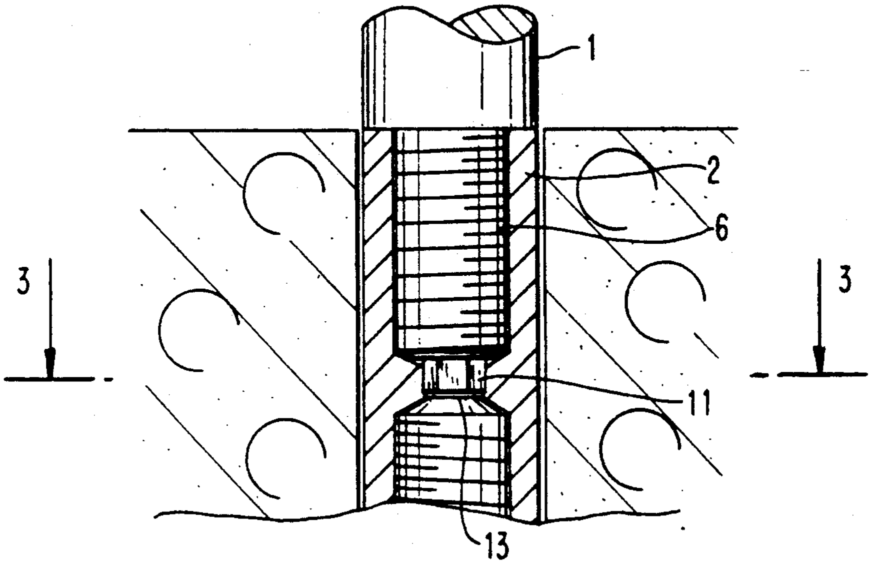
FIG. 2 is a detailed cross sectional view of a portion of the mounting assembly indicated in the circled portion 2' in FIG. 1, showing the engagement of the mounting tool in the shank member in the vicinity of the internal bore.
Figure 3:
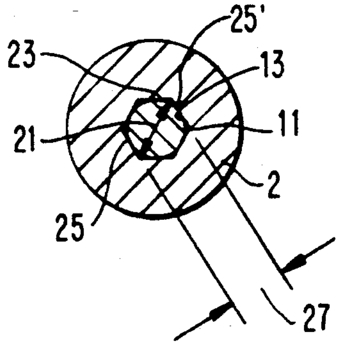
FIG. 3 is a transverse cross sectional view through the mounting assembly of FIG. 1 taken along the section line 3—3 of FIG. 2.

The mounting tool 1 has a shank portion 9 adapted to be clamped in a chuck of an impact drilling machine or the like (not shown). The end portion 10 of the mounting tool 1 facing the shank member 5 is shaped like a polyhedron. This polyhderon end portion 10 is inserted, during mounting, into the shank member 5 until the polyhedron end portion 11 rests against the collar 12 formed in the internal bore 13. As shown in more detail in FIGS. 2 and 3, by the impact action of the impact hammer drill, the polyhedron end portion 11 is punched or forced a distance corresponding to its length 14 into the internal bore 13 or the walls 23 of the internal bore 13. This internal bore 13 has a diameter that is less than the diameter of the internal thread 6. The diameter of the internal bore 13 is also less than the maximum distance 21, as shown in FIG. 3, across the polyhedron end portion 11. This insures that the polyhedron end portion 11 must be forced by the drilling machine into the walls 23 of the internal bore 13 and that the shank member 5 will rotate with the mounting tool 1 during installation of the expansible anchor 2. This produces a torque-transferring connection between the mounting tool 1 and the shank member 5 which causes the shank member 5 to move onto the threaded bolt 3 by rotating impact action.

The rotating impact action is assisted by the stop shoulder 15 formed on the mounting tool 1, which shoulder rests on the end face of the shank member 5, when the polyhedron end portion 11 has fully penetrated into the internal bore 13.

During the mounting operation, the expander body 4 remains in place at the bottom of the drill hole 16 due to friction existing between the expander body 4 and the bottom of the drill hole, so that the shank member 5 can be screwed onto the expander body 4 in axial direction. The expansible sleeve 7 is pushed by the shank member 5 onto the expander body 4 and expands, so that its expansible leaves 8 engage with a matching fit in the undercut 17. Once the mounting process has ended, the shank member stops abruptly. As a result of the torque further being applied through the mounting tool 1, the internal bore 13 is reamed out by the edges of the polyhedron end portion 11 to a diameter corresponding to the distance 21 between the diametrically opposite edges thereof so that the mounting tool 1 can continue to rotate without transferring any torque. As the result of the interruption in the torque, firstly, the positioned expansible anchor is protected and, secondly, slewing of the impact hammer drill is prevented. An optimum relationship between the transfer of torque, on the one hand, and interruption of the transfer, on the other hand, is achieved when the distance 27 between opposite lateral faces 25,25' (in the case of the preferred hexagonal end portion 11) of the polyhedron end portion 11, which is preferably hexagonal, corresponds approximately to the diameter of the internal bore 13, and the length 14 of the polyhedron end portion 11 corresponds approximately to one third of that dimension. The distance between stop shoulder 15 and the end face of the polyhedron end portion 11 is substantially equal to the distance between the end face of the shank member 5 and the collar 12.

While the invention has been illustrated and described with reference to specific embodiments of a mounting assembly, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is:

1. A mounting assembly comprising an expansible anchor including a threaded bolt having an expander body, an expansible sleeve, a shank member having an internal bore and an internal thread that enables said shank member to be screwed on said threaded bolt to provide for expansion of said expansible sleeve over said expander body, said internal bore having walls and a diameter that is less than a diameter of said internal thread; and a mounting tool adapted to be clamped in a drill chuck of a drilling machine and the mounting tool having a polyhedron end portion shaped like a polyhedron and having lateral faces and edges for engaging the walls of said internal bore of said shank member, and said internal bore with the walls and said polyhedron end portion provided with the lateral faces and edges being structured so that, when said mounting tool engages said internal bore, when said mounting tool is clamped in said drill chuck and when said drilling machine is operated, the lateral faces of said polyhedron end portion engage with the walls of said internal bore, so that said shank member rotates with said mounting tool and is screwed onto said threaded bolt.

2. A mounting assembly as set forth in claim 1, wherein said polyhedron end portion is hexagonal.

3. A mounting assembly as set forth in claim 1, wherein said mounting tool having a stop surface engagable with an end surface of said shank member for limiting penetration of said mounting tool into said internal bore.

* * * * *